Figure 1:
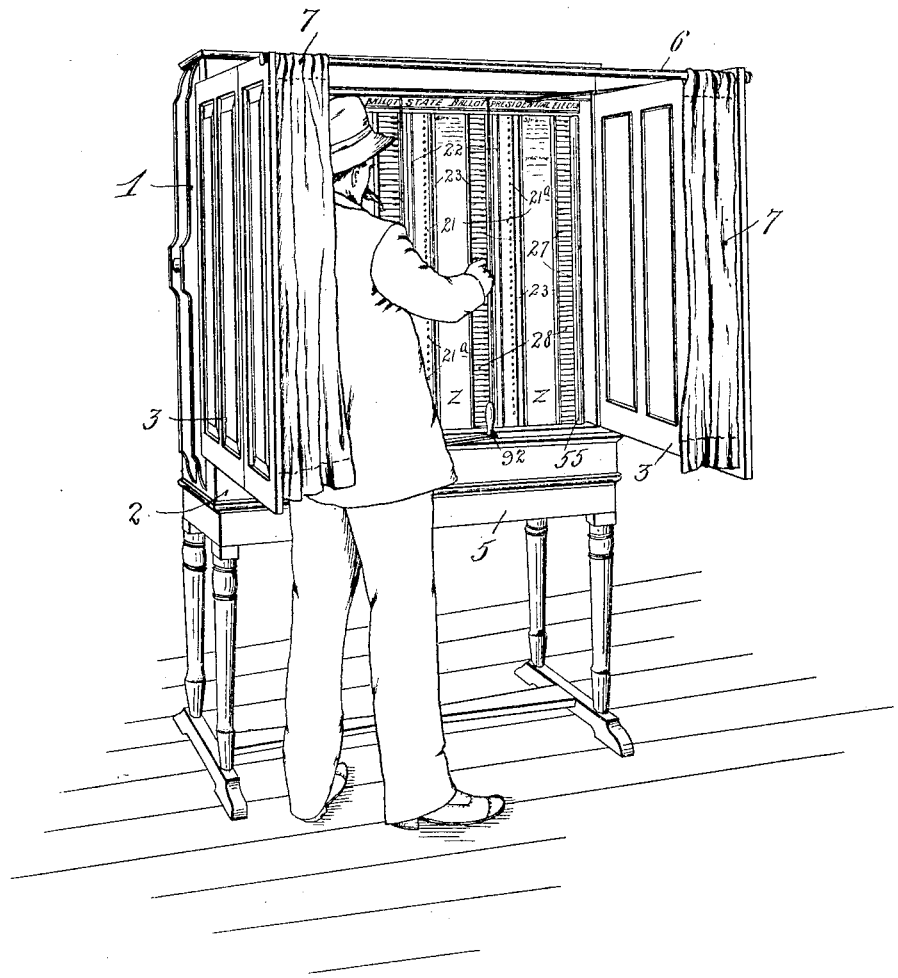

No. 804,961. PATENTED NOV. 21, 1905.
S. LOE.
VOTING MACHINE.
APPLICATION FILED MAY 4, 1903.

13 SHEETS—SHEET 1.

Witnesses.
H. D. Kilgore
A. H. Opsahl

Inventor.
Syver Loe.
By his Attorneys.
Williamson Merchant

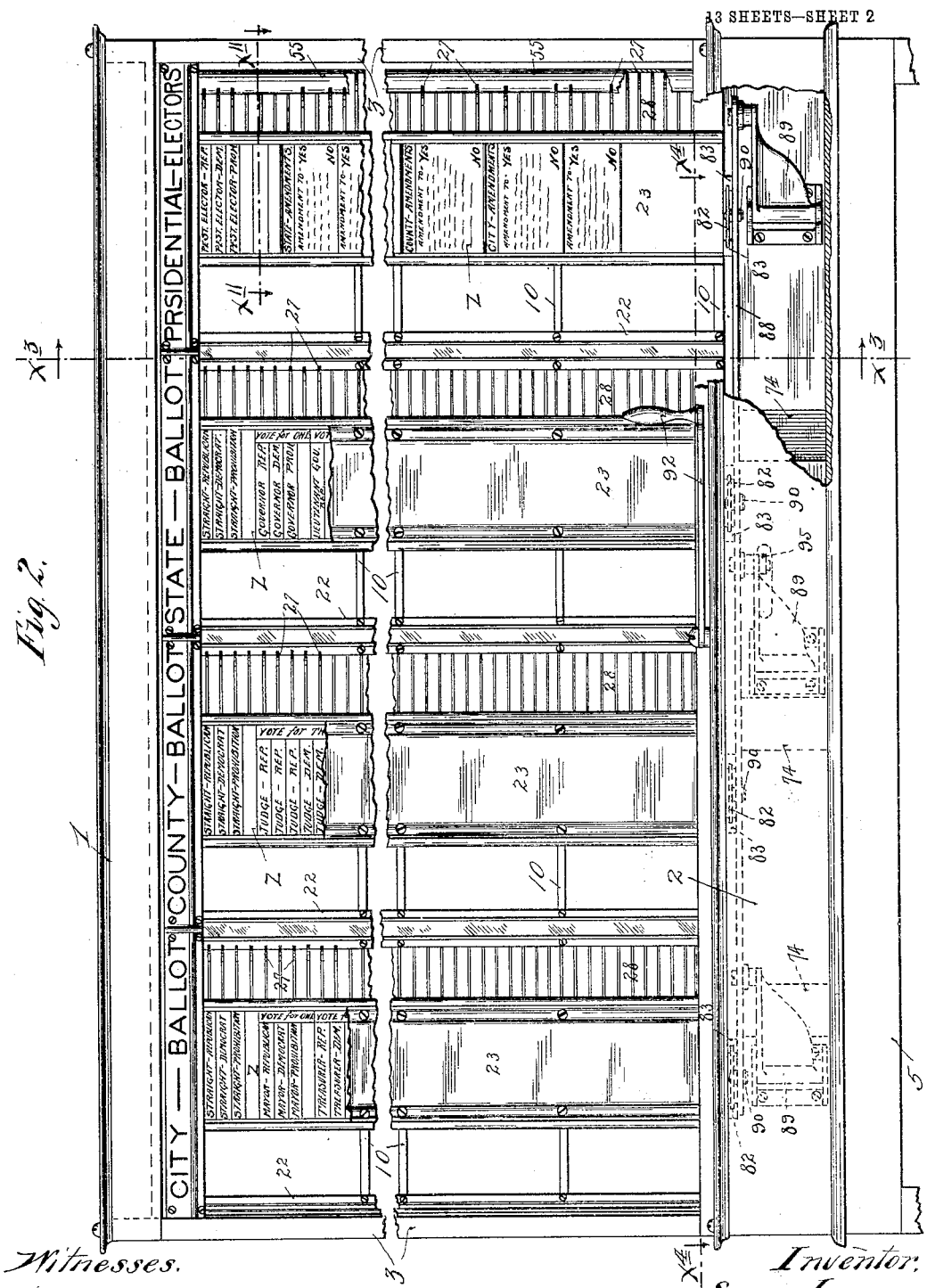

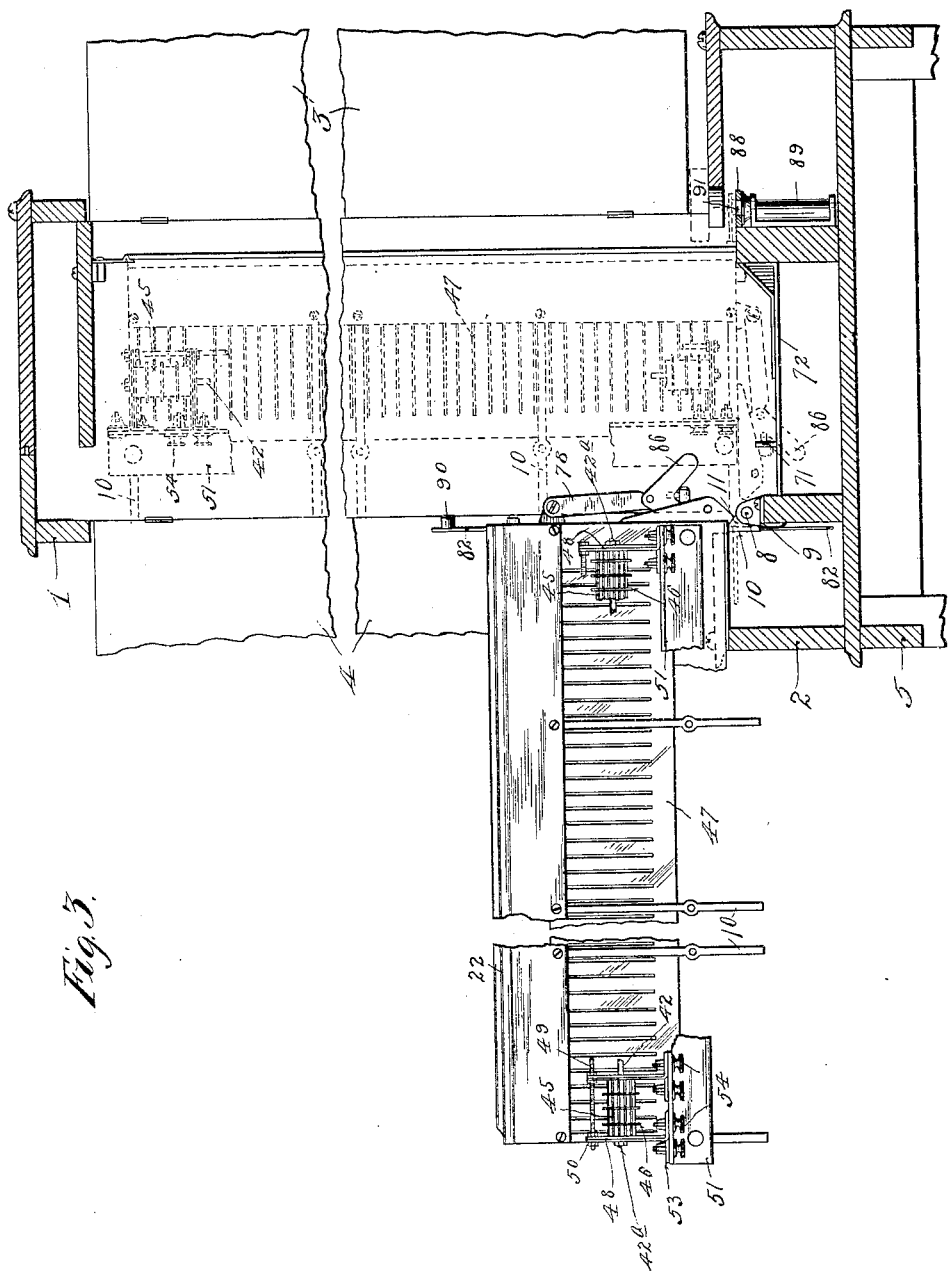

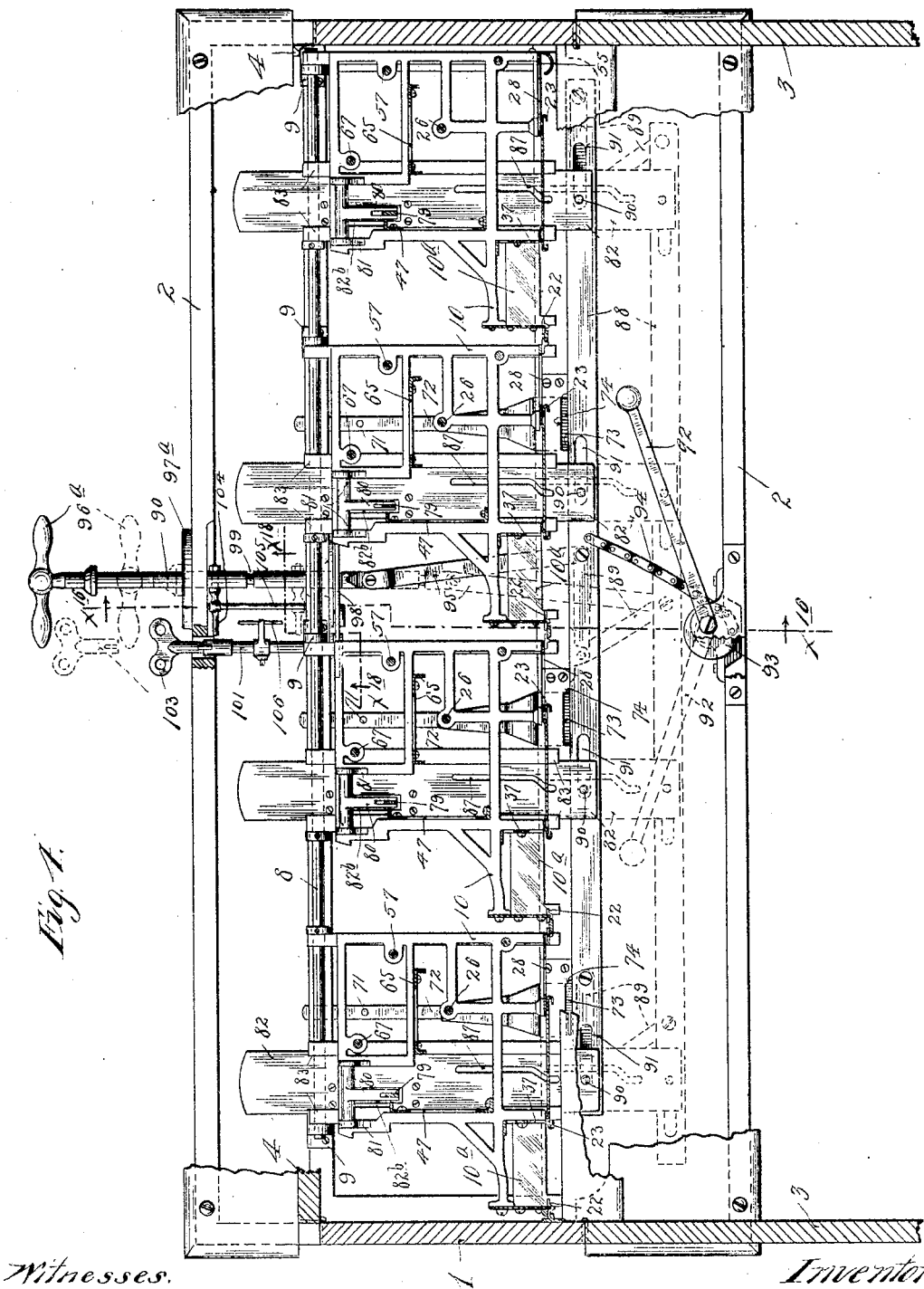

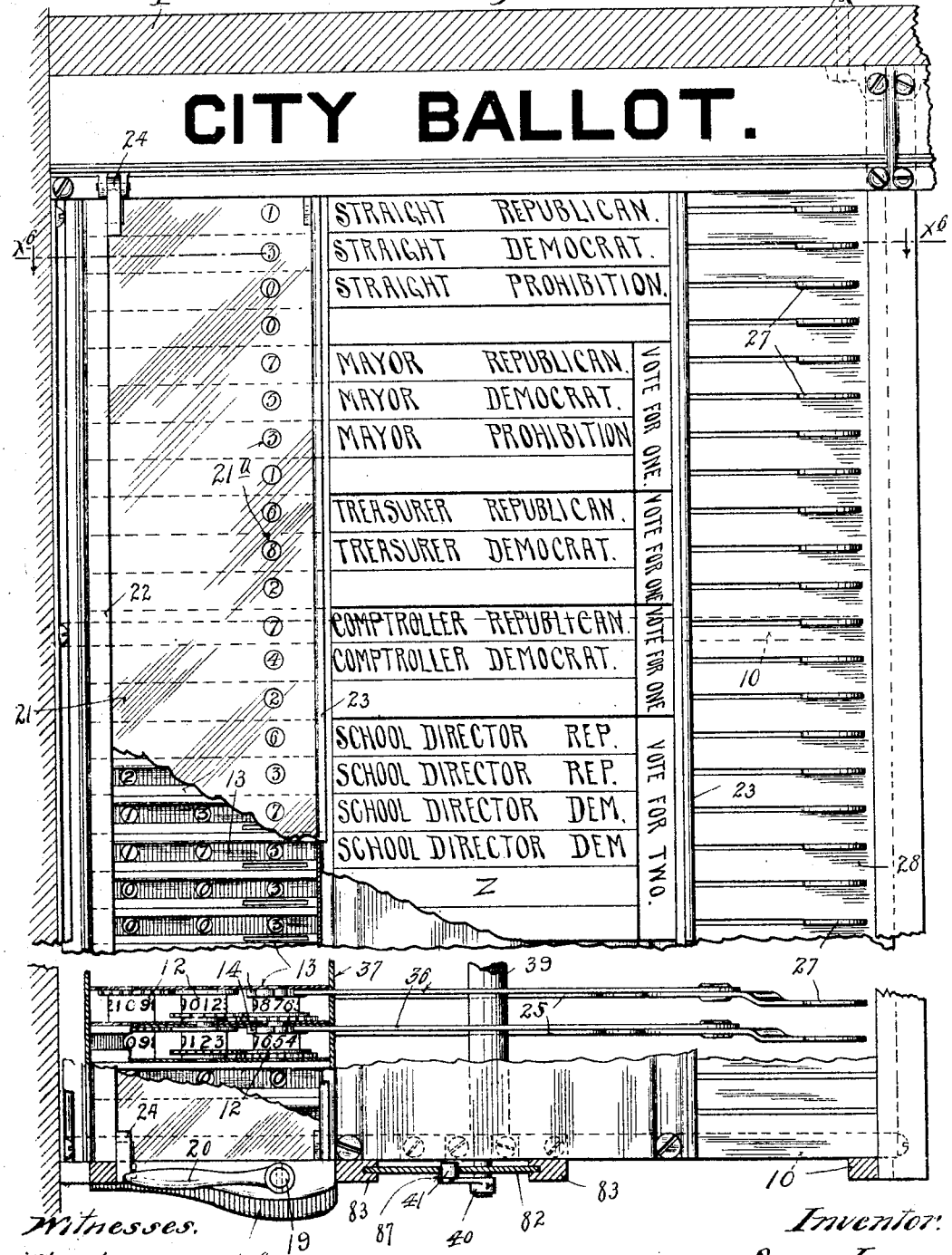

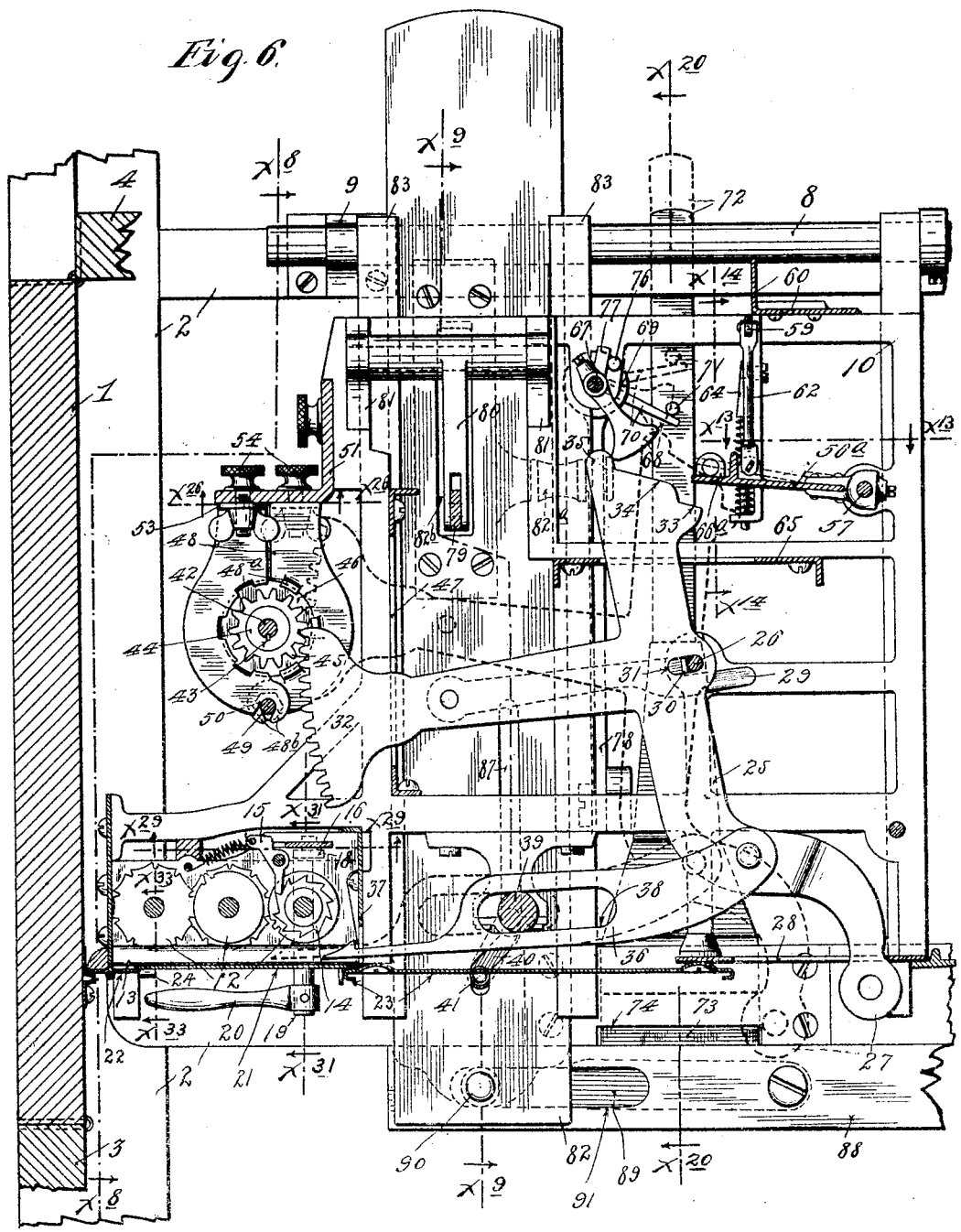

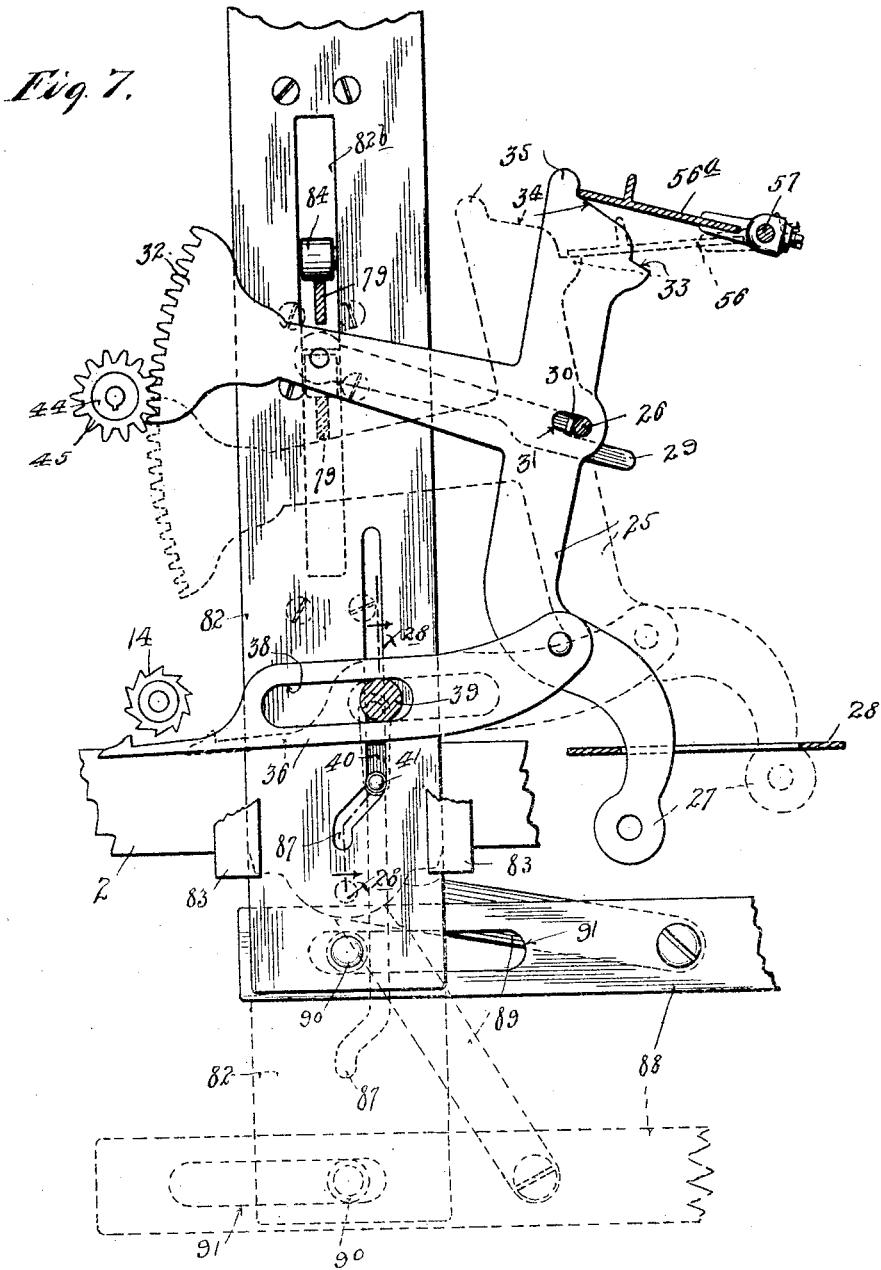

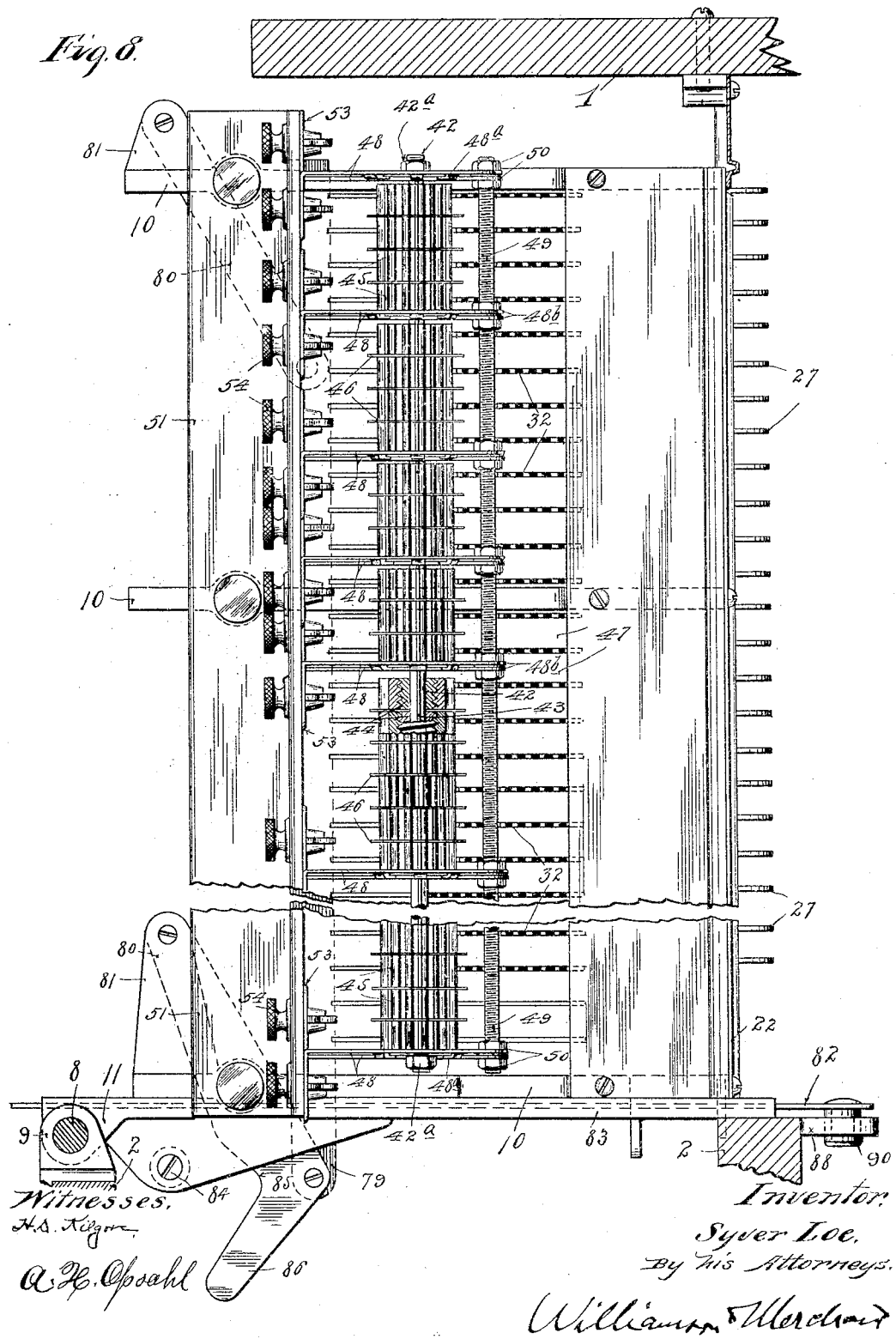

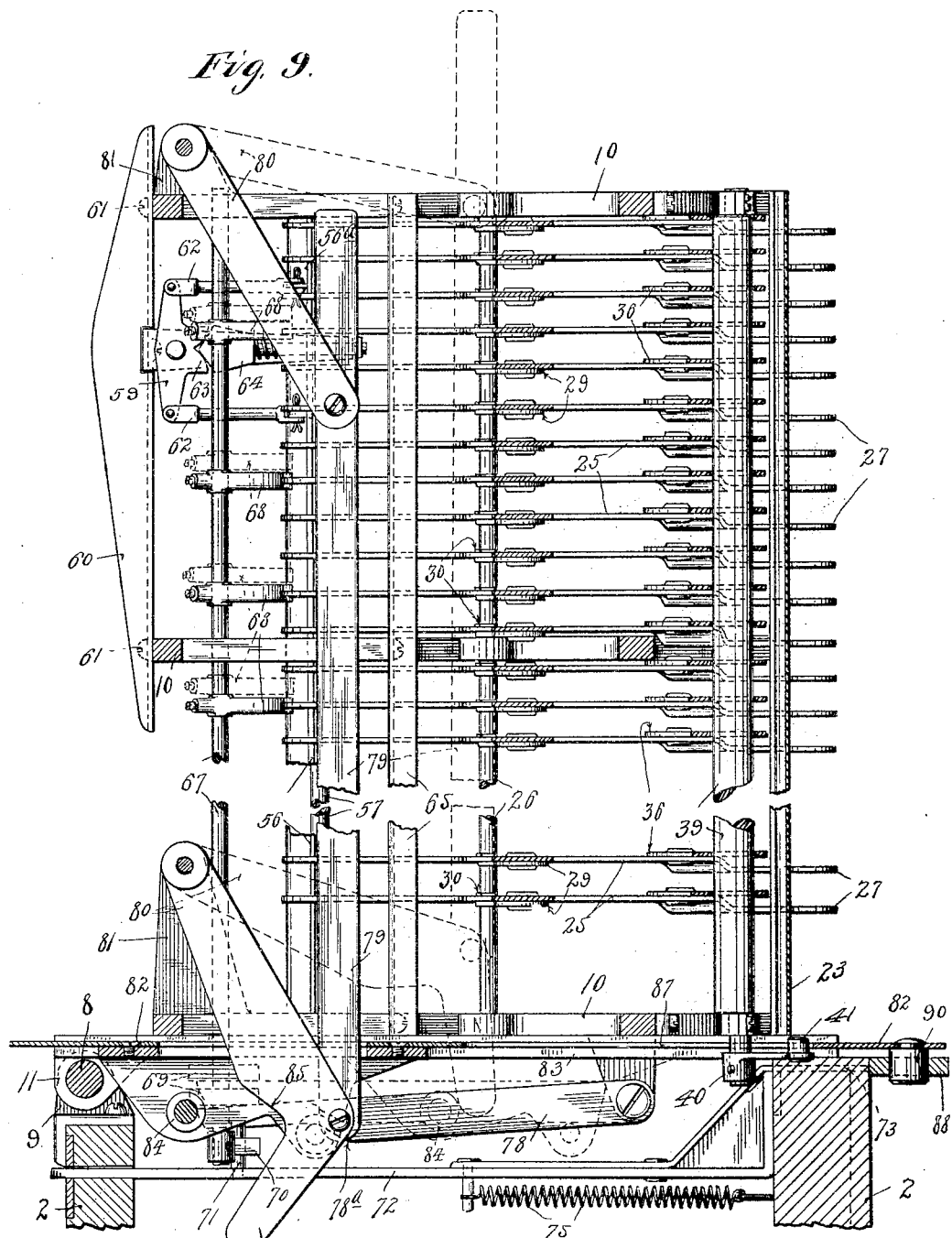

No. 804,961. PATENTED NOV. 21, 1905.
S. LOE.
VOTING MACHINE.
APPLICATION FILED MAY 4, 1903.
13 SHEETS—SHEET 10.
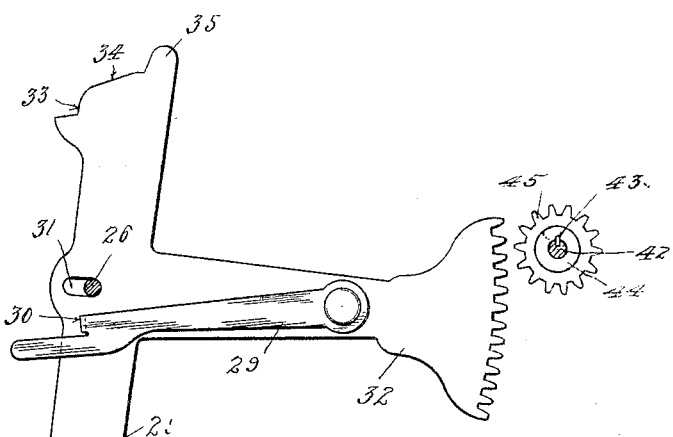
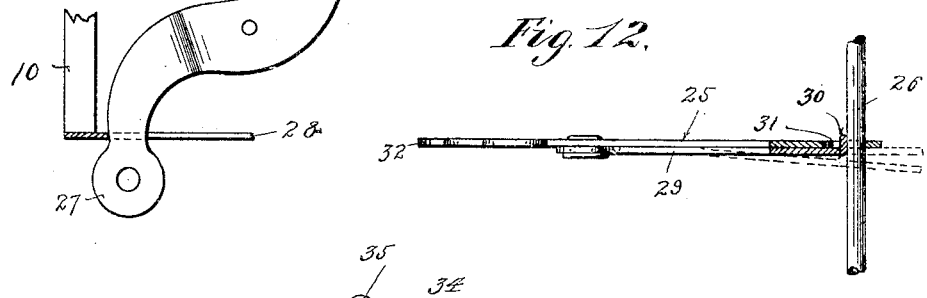
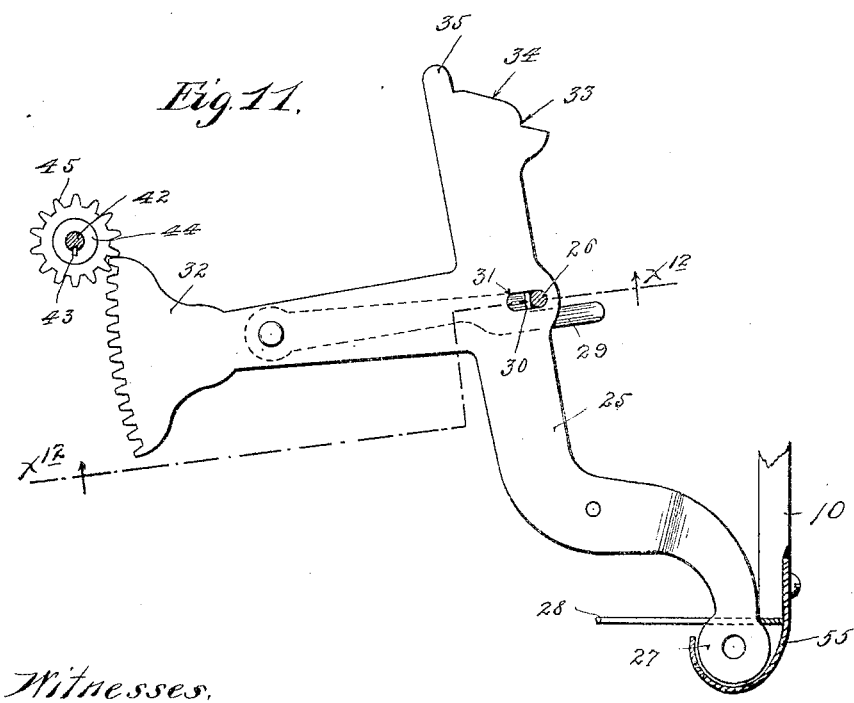
Witnesses
H. D. Kilgore
A. H. Opsahl
Inventor
Syver Loe.
By his Attorneys,
Williamson & Merchant No. 804,961. PATENTED NOV. 21, 1905.
S. LOE.
VOTING MACHINE.
APPLICATION FILED MAY 4, 1902.
13 SHEETS—SHEET 11.
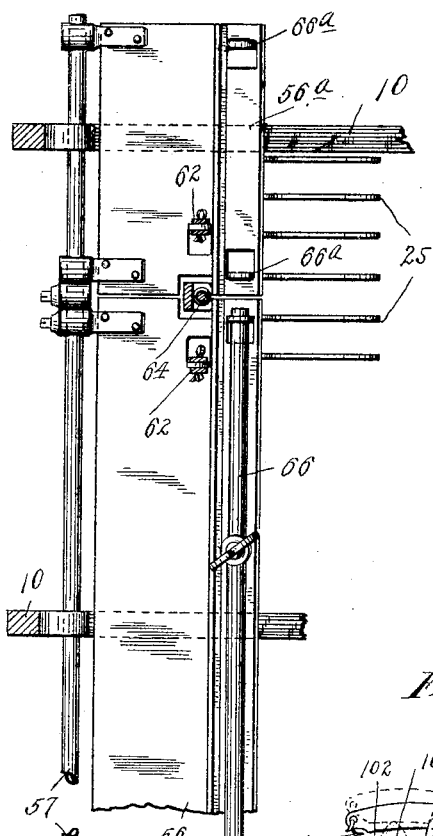
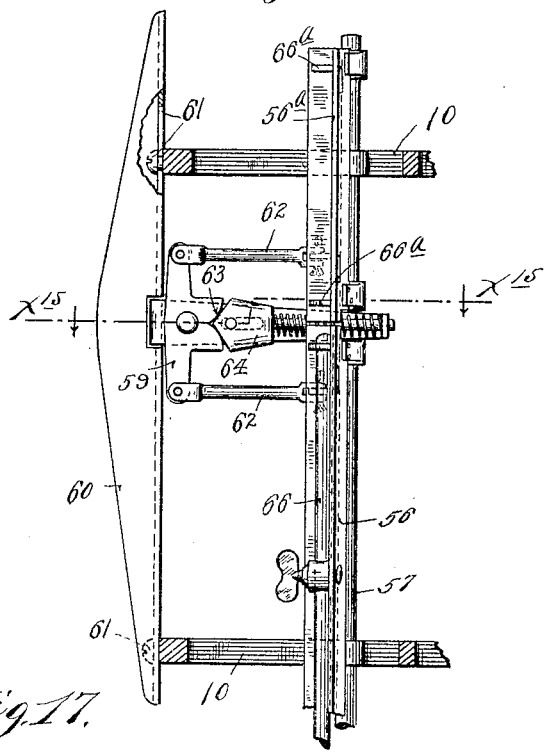
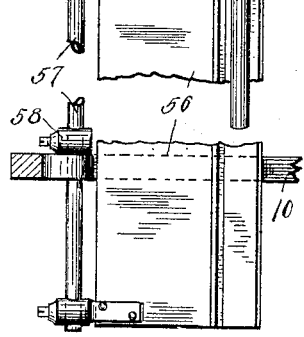
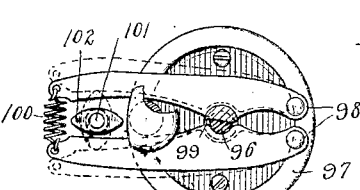
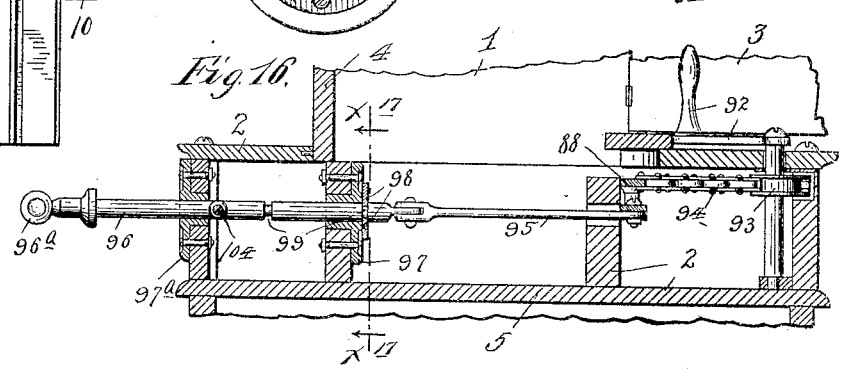
Inventor
Syver Loe,
By his Attorneys,

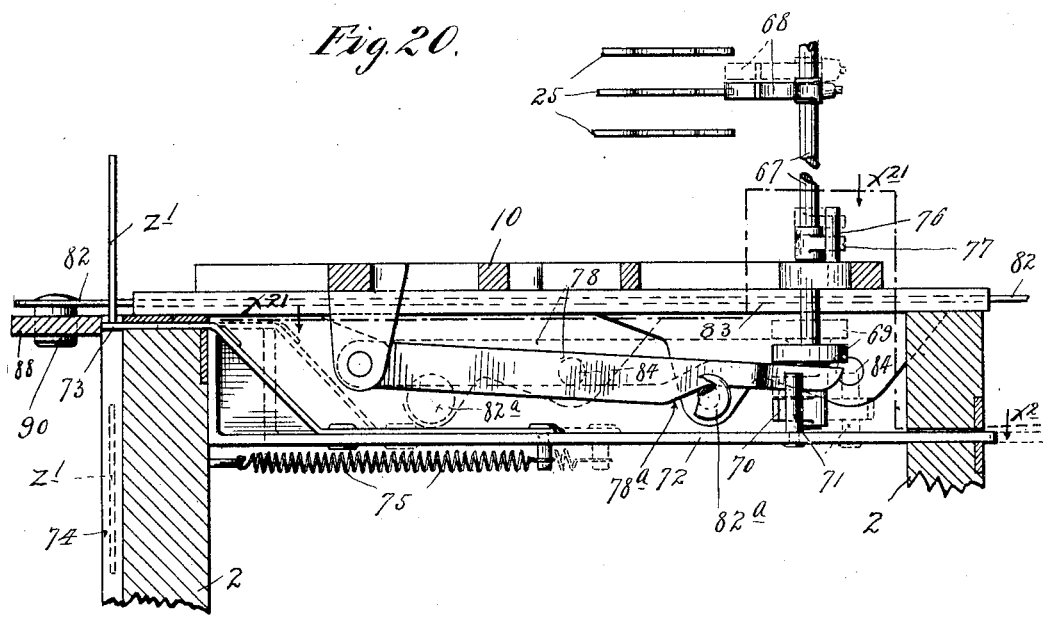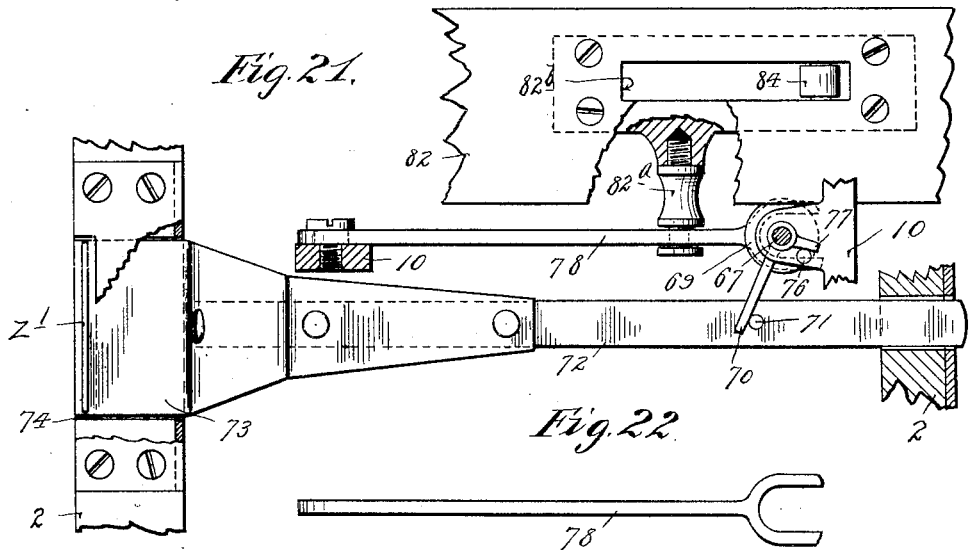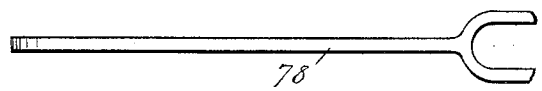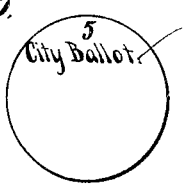

No. 804,961. PATENTED NOV. 21, 1905.
S. LOE.
VOTING MACHINE.
APPLICATION FILED MAY 4, 1903.
13 SHEETS—SHEET 13.
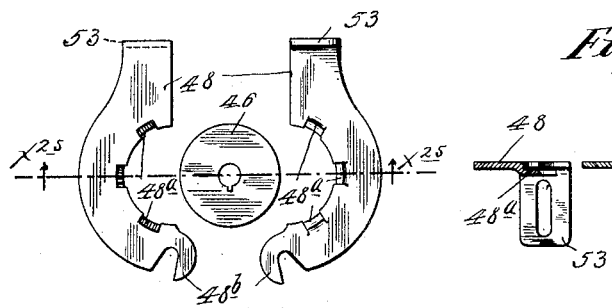
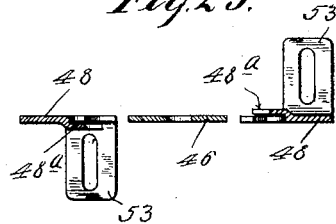
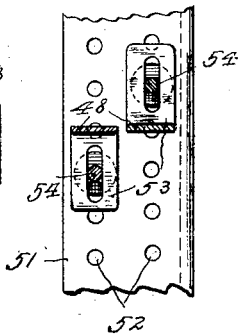
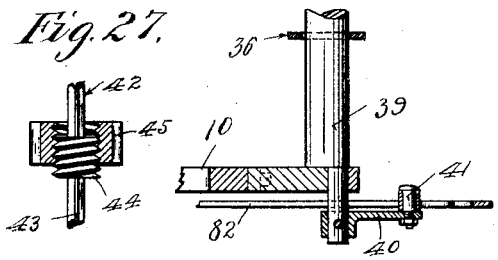
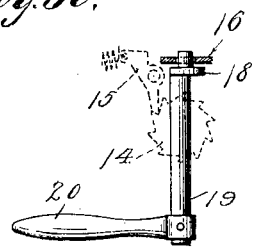
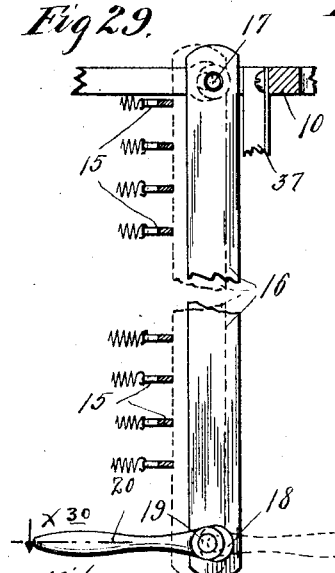
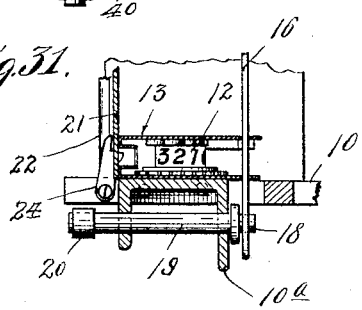
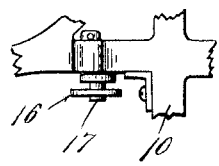
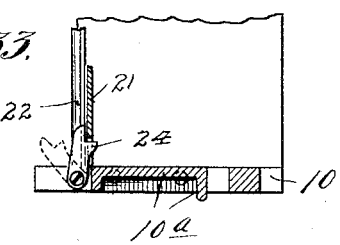
Witnesses,
H. D. Kilgore,
A. H. Opsahl.
Inventor,
Syver Loe,
By his Attorneys,
Williamson & Merchant

UNITED STATES PATENT OFFICE.

SYVER LOE, OF MINNEAPOLIS, MINNESOTA.

VOTING-MACHINE.

No. 804,961.   Specification of Letters Patent.   Patented Nov. 21, 1905.

Application filed May 4, 1903. Serial No. 155,461.

*To all whom it may concern:*

Be it known that I, SYVER LOE, a citizen of the United States, residing at Minneapolis, in the county of Hennepin and State of Minnesota, have invented certain new and useful Improvements in Voting-Machines; and I do hereby declare the following to be a full, clear, and exact description of the invention, such as will enable others skilled in the art to which it appertains to make and use the same.

My invention relates to voting-machines, and has for its object to improve the same in the several particulars hereinafter noted.

The invention consists of the novel devices and combinations of devices hereinafter described, and defined in the claims.

Certain of the features illustrated in the application are disclosed and claimed in my prior United States patents identified as follows: No. 688,533, of date December 10, 1901; No. 688,534, of date December 10, 1901, and No. 712,079, of date October 28, 1902.

The machine herein illustrated, as well as those illustrated in the prior patents above identified, involves in its most complete and approved form several vertically-arranged series of registers and register-actuators. Each series of registers and actuators is subdivided into groups, the number of each in a particular group being equal to the number of candidates for the particular office to which the group is appropriated. For each group of actuators there is a vote-limiting device which operates after the predetermined number of votes (one or more) have been cast or selected for a particular office to lock or render inoperative all other actuators of that group. The vote-limiting devices illustrated in the present machine are disclosed and broadly claimed in my above-identified patent, No. 712,079.

A machine embodying the several novel features of improvement over the prior machines is illustrated in the accompanying drawings, wherein like characters indicate like parts throughout the several views.

Figure 1 is a perspective view showing the complete machine, including a cabinet adapted to form a voting-booth, and showing also a man standing within the booth and operating the machine to register votes. Fig. 2 is a front elevation of the machine with some parts broken away and others removed. Fig. 3 is a vertical section taken from front to rear of the machine on the line $x^3 x^3$ of Fig. 2 and illustrating the two extreme positions of one of the hinged sections of the machine. Fig. 4 is a horizontal section taken approximately on the line $x^4 x^4$ of Fig. 2, some parts being broken away and others being removed. Fig. 5 is a front elevation with some parts broken away and others sectioned, showing one section of the machine. Fig. 6 is a horizontal section on the line $x^6 x^6$ of Fig. 5. Fig. 7 is a detail taken in the same horizontal section as Fig. 6, but showing different positions of the parts. Fig. 8 is a transverse vertical section taken on the irregular line $x^8 x^8$ of Fig. 6, some parts being broken away. Fig. 9 is a transverse vertical section on the irregular line $x^9 x^9$ of Fig. 6. Fig. 10 is a detail in bottom plan looking at one of the register-actuating levers or keys and showing also certain associated parts. Fig. 11 is a detail in horizontal section on the line $x^{11} x^{11}$ of Fig. 2, showing in plan one of the actuating-levers and means for locking the same. Fig. 12 is a section on the irregular line $x^{12} x^{12}$ of Fig. 11. Fig. 13 is a detail in vertical section on the line $x^{13} x^{13}$ of Fig. 6. Fig. 14 is a detail in section on the line $x^{14} x^{14}$ of Fig. 6, showing substantially the same parts that are shown in Fig. 13. Fig. 15 is a section on the line $x^{15} x^{15}$ of Fig. 14. Fig. 16 is a vertical section on the line $x^{16} x^{16}$ of Fig. 4, showing only the lower portion of the machine. Fig. 17 is a detail view, on an enlarged scale, taken on the sectional line $x^{17} x^{17}$ of Fig. 16. Fig. 18 is a detail in section on the irregular line $x^{18} x^{18}$ of Fig. 4. Fig. 19 is a section on the line $x^{19} x^{19}$ of Fig. 18. Fig. 20 is a detail view, in vertical section, on the line $x^{20} x^{20}$ of Fig. 6. Fig. 21 is a detail in horizontal section on the irregular line $x^{21} x^{21}$ of Fig. 20, some parts being broken away. Fig. 22 is a plan view of the shipper-lever shown in Figs. 20 and 21. Fig. 23 is a face view of a disk which may be used as a ticket for independent votes—that is, in voting for persons not represented on the ticket. Fig. 24 shows one of the stop-brackets and coöperating spacing-disks of the vote-limiting mechanism, said parts being shown in plan and being separated from each other. Fig. 25 is a section on the line $x^{25} x^{25}$ of Fig. 24. Fig. 26 is a section on the line $x^{26} x^{26}$ of Fig. 6. Fig. 27 is a detail, partly in section and partly in elevation, showing a coöperating hub and pinion of the vote-limiting mechanism. Fig. 28 is a detail in vertical section on the line $x^{28} x^{28}$ of Fig. 7, some parts being broken away. Fig. 29 is a vertical section on the line $x^{29} x^{29}$ of Fig. 6, some parts being broken away. Fig. 30 is a detail in horizontal section on the line $x^{30} x^{30}$ of Fig. 29, some parts being removed and others being indicated by dotted lines. Fig. 31 is a vertical section on the line $x^{31}$ $x^{31}$ of Fig. 6, some parts being broken away. Fig. 32 is a plan view of certain of the parts shown in Fig. 29, certain other parts being broken away; and Fig. 33 is a detail in vertical section on the line $x^{33}$ $x^{33}$ of Fig. 6, some parts being broken away.

*Framework and supports.*—Advisably there is provided a case or cabinet 1, having a box-like base 2 and front and rear folding doors 3 and 4, respectively. The base 2 of the case 1 is conveniently supported by a table 5. The front doors 3 when opened up afford access to the actuating keys or levers and are adapted for use in connection with a rod 6 and curtain 7 to form a voting-booth, as shown in Fig. 1. The rear doors 4 when opened up afford access to the mechanism of the machine. In this preferred arrangement of the machine there are four vertically-disposed columns of registers or tallies and coöperating register-actuators and associated mechanisms, and each of these four groups of devices is supported by an independent rectangular skeleton frame, which is hinged to a common base for movements to and from an operative position, which two positions are best indicated in Fig. 3.

The numeral 8 indicates a horizontally-extended hinge-rod which, as shown, is rigidly secured to hinged lugs 9 on one of the inner bars of the base 2. (See particularly Figs. 3, 4, and 6.) The numeral 10 indicates as entireties the four independently-hinged skeleton frames, having lugs 11, which pivot loosely on the hinged rod 8.

*Registers or tallies.*—The registers or tallies, which are indicated as entireties by the numeral 12, are arranged in vertical columns and suitably mounted in case-sections 13, secured to the corresponding skeleton frames 10 and provided with suitable sight-openings, through which the numerals marked on the peripheries of the several tally-wheels may be exposed to view. The unit members of the tally-wheels are provided with ratchet-wheels 14, with which coöperate spring-pressed retaining-pawls 15, pivoted to said case-sections 13, as best shown in Fig. 6. These retaining-pawls 15 permit free movements of the tally-wheels under the actions of the coöperating actuating levers or keys, but are adapted to be held so as to lock the tallies by means best shown in Figs. 6, 29, 30, 31, and 32. Of the parts of this tally-locking device the numeral 16 indicates a vertically-disposed lock-bar, of which there is one for each of the four vertical columns of registers or tallies. The lock-bar 16 at its upper end is mounted on a loose eccentric 17, journaled in the upper portion of the corresponding skeleton frame 10, and at its lower end it is mounted on a similar eccentric 18, which, however, is carried by a short shaft 19, mounted in the channeled base-piece $10^a$ of said frame 10, and is provided at one end with a hand-piece 20, by means of which the eccentrics may be rocked to move the lock-bar 16 from its inoperative position shown by full lines in Figs. 6, 29, and 30 into its inoperative position shown by dotted lines in Fig. 29. When in its inoperative position, the lock-bar 16 positively holds all of the retaining-pawls in their normal positions, (shown in Figs. 6 and 30,) and thereby locks the unit members of the tallies against movement in either direction.

It is important to cover the tallies, so that while the polls are opened no person can determine the total number of votes registered for any candidate. It is, however, very desirable that some means be provided which will enable the voter to see that votes have actually been registered for the candidates for whom he has voted. As a simple means for accomplishing this result I provide shield-plates 21, which cover the sight-openings that expose to view the numerals of all of the tally-wheels except the unit members, but which have perforations $21^a$, through which may be seen the alined numerals of the units-wheels only of the tallies.

The shield-plates 21 are, as shown, held by a strip 22 and by the adjacent edges of corresponding ticket-holding plates 23. As shown, the shield-plates 21 are further held by pivoted dogs 24, which engage notches in the ends thereof, as shown in Figs. 5 and 33 and hold the same against lateral movement.

The four ticket-holding plates 23 are suitably secured to the front portions of the respective pivoted skeleton frames 10, and their edges are turned inward, so as to frictionally hold in place the corresponding tickets, (indicated by the character $z$ in Figs. 2 and 5.) The ticket-holding plates themselves are best shown in Fig. 6. The tickets $z$ will of course be so disposed that the different candidates indicated thereon will be presented in horizontal line with the tallies appropriated thereto.

*Register-actuating levers or keys.*—The register-actuating levers 25, of which there is one for each tally, are located in horizontal planes, one above the other, and are pivoted each series on a vertical shaft 26, suitably supported at its ends and intermediate portion by the corresponding skeleton frame 10. Projecting finger-pieces 27 of the said actuating-levers work through guide-combs 28, suitably supported on front of the corresponding frame 10.

Each actuating-lever 25 has a pivoted latch 29, which is adapted to spring laterally and which has a laterally-bent lug 30, that normally projects through an elongated slot 31 of the actuating-lever. The pivot-shaft 26, it will be noted by reference particularly to Figs. 6, 10, 11, and 12, passes through the elongated slot 31 of said actuating-levers, and the latches 29 normally hold the said actuating-levers with one extremity of their slots 26 engaging the said rod for a purpose which will hereinafter appear. Each actuating-lever 25 is provided with a tooth-segment 32 on one projecting arm and with a lock-shoulder 33, cam-surface 34, and cam-nose 35 on another projecting arm, all for purposes which will also hereinafter appear.

To each actuating-lever 25 is pivoted a register-actuating pawl 36, the projecting toothed end of which acts upon the coöperating tally-ratchet 14 in a manner hereinafter described. The free ends of the pawls 36 work freely through guide-combs 37, rigidly secured to the corresponding skeleton frame 10. At their intermediate portions the pawls 36 are provided with longitudinal slots 38, in which work the eccentric intermediate portions of an eccentric-shaft 39, the trunnion-like ends of which are suitably journaled in the upper and lower portions of the corresponding skeleton frames 10, as best shown in Figs. 6, 9, and 28. To the lower end trunnions of the eccentric-shaft 39 are rigidly secured crank-arms 40, having at their free ends roller-equipped studs 41. (Best shown in Fig. 28.)

*Vote-limiting mechanism.*—For the construction of the so-called "vote-limiting mechanism," which has been disclosed and broadly claimed in my prior patent, No. 712,079, referred to above, attention is called particularly to Figs. 6, 8, 24, 25, 26, and 27. The numeral 42 indicates vertically-disposed non-rotary shafts, which are rigidly supported, one on each skeleton frame 10, by means presently to be described. Each of these shafts is provided with a long key, which extends nearly or quite from one end to the other thereof. Mounted to slide on each shaft 42, but held against rotation thereon by its key 43, is a series of screw-threaded hubs 44, on each of which hubs is mounted with screw-threaded engagement a spur-pinion 45, which acts as a nut. Mounted on the shaft 42, between the sliding hubs 44, are washers 46. The same kind of washers are also placed just above the upper hub and just below the lower hub, and all of said washers are held against rotation by the key 43.

Each pinion 45 meshes with the toothed segment 32, carried by the coöperating actuating-lever 25, and it will be noted that said pinions have very wide faces as compared with the said segments, so that the said gears are permitted a very considerable lateral movement without going out of mesh with their coöperating segments. The arms of the levers 25, which carry the segments 33, work through guide-combs 47, rigidly secured to the corresponding frames 10.

The sliding hubs and gears are separated into groups by stop-brackets 48, preferably formed in two parts, having segmental seats afforded by laterally-offset lips 48ª, which embrace and hold certain of the washers 46. (See Figs. 6, 8, and 24.) The sections of the stop-brackets 48 are provided at their overlapping ends with hooks 48ᵇ, which clamp and fulcrum upon a vertically-disposed screw-rod 49, provided with nuts 50, that clamp the said hooked ends. This screw-rod 49 and its nuts 50 tie together and brace the several stop-brackets. These stop-brackets 48 are rigidly secured to a vertically-disposed bar 51, shown of angle-like form, which bar in turn is rigidly secured to the corresponding skeleton frame 10. (See particularly Figs. 6 and 8.) The brackets 48 are adjustably secured to the bar 51, such adjustment being, as shown, accomplished by providing said bar with perforations 52 and providing the sections of the brackets 48 with slotted feet 53, through which and the said perforations work nutted bolts 54. The great importance of having the stop-brackets 48 adjustable, so that the number of hubs and pinions in a group may be quickly and easily varied, thereby adapting the machine to the conditions of different elections, is of course obvious. It is of course evident that the intermediate brackets may be applied to hold any of the intermediate washers 46 and that the said washers being thus held become stops to limit the spreading movements of the hubs 44 and the pinions 45 of the group located between any two adjacent washers. As best shown in Fig. 8, the non-rotary shaft 42 is provided at its ends with nuts 42ª, that are screwed against the upper and lower washers 46, so that the upper and lower brackets 48 become supports for the said shaft.

*Lever detainer.*—The section of the machine at the extreme right with respect to Figs. 1 and 3 is appropriated to presidential elections and to certain proposed amendments which must be voted "yes" or "no," and as these proposed amendments are printed on the ticket and occupy considerable space it becomes necessary to render inoperative all of those actuating-levers coming within the vertical limits of the space occupied by the amendment except those two which stand directly in line with the words "yes" and "no." This I accomplish by the use of what is herein termed a "lever-detainer" and which is best afforded by a semitubular strip 55, that is detachably secured, by screws or otherwise, to the forward right-hand corner of the right-hand frame 10. (See Figs. 2 and 11.) By reference to said views it will be noted that those actuating-levers which are held in inoperative positions by the strip 55 are moved into what may be termed "abnormal inoperative positions." Otherwise stated, the strip 55 acts as a stop for limiting the movement in the one direction of such of the actuating-levers as are capable of being operated, and those levers which are held inoperative by said strip are given an extreme movement in order that the said strip may engage and hold them. As is evident, those actuating-levers which are held as indicated in Fig. 11 are rendered absolutely inoperative. By this device any of the actuating-levers of the group may be rendered inoperative or held so that they cannot be moved by the voter.

*Straight-vote device.*—The straight-vote device employed in the present machine is broadly disclosed and claimed in my prior patent, No. 688,534, above identified. In the arrangement of the ballots illustrated in Fig. 2 several of the uppermost actuating-levers—as shown, the upper three—of all of the groups except the group at the extreme right are appropriated to straight votes, and straight-vote devices are provided for coöperation with the actuating-levers of the said three groups. Each of the straight-vote devices involves parts which may be briefly described as follows, attention being especially called to Figs. 6, 7, 13, 14, and 15: A so-called "straight vote" stop-blade is made up of two sections 56 and 56$^a$, which blade-section 56 is secured to said shaft, and which blade-section 56$^a$ is loosely pivoted on said shaft. The shaft 57 is loosely pivoted in portions of the corresponding frame 10 and is held in different vertical adjustments by an adjustable stop 58. (See Fig. 13.) By vertical adjustments of the shaft 57 the blade-section 56$^a$ may be brought into position for coöperation with any desired number of the upper actuating-levers, according to the number of political parties represented on the ticket. For instance, if a fourth party were to be represented on the tickets, the name of such party might be placed in the fourth space from the top, which space in Fig. 2 is left blank. Hence the vertical adjustment of the divided stop-blade is important. It is furthermore believed to be a novel feature. The blade-sections 56 and 56$^a$ are connected for reverse pivotal movements by an oscillating lever 59, pivoted to a bar 60, which in turn is secured for vertical adjustments by screw-and-slot engagement 61 to parts of the corresponding frame 10. (See Fig. 14.) The ends of the lever 59 are connected by links 62 to the respective blade-sections 56 and 56$^a$. At its central portion the lever 59 is further provided with a V-shaped cam-notch 63, that is engaged by the point of a spring-pressed centering-plunger 64, mounted for sliding movements on a lateral extension of the adjustable bar 60. The said spring-pressed plunger, acting on the notch 63, yieldingly holds the blade-sections normally in the same plane—to wit, in intermediate positions indicated by full lines in Fig. 6.

The arms of the actuating-levers 25, which carry the previously-noted parts 33, 34, and 35, work through a guide-comb 65, suitably secured to the corresponding frame 10. The said parts 33 34 coöperate with the blade-section 56 and 56$^a$ in a manner which will be made clear in the description of the operation. In Figs. 13 and 14 the blade-section 56 is shown as provided with an endwise-movable locking-bolt 66, which in the present adjustment of the machine performs no office, but is adapted to pass through lugs 66$^a$ on the blade-section 56$^a$ to lock the said blades together when the machine is to be used as a primary-election machine, an action which need not here be considered.

*Independent-vote device.*—To provide for the voting of independent votes—that is, the voting for candidates not represented on the tickets—there is provided a novel device, preferably constructed as follows: Loosely journaled in all of the frames 10 except the one at the extreme right is a vertical rock-shaft 67, which is provided with tappets 68, that normally stand in position to be engaged one by the cam-lug 35 of those actuating-levers which are appropriated to independent votes. On all of the tickets except the one at the right spaces will be left blank or marked to indicate independent votes opposite those actuating-levers which are assigned to independent votes. At its lower end (see Figs. 20 and 21) the rock-shaft 67 is provided with a collar 69 and an arm 70. The arm 70 is engaged by a pin 71 of a slide 72, mounted in the base 2. At their front ends the slides 72 are provided with cut-off blades 73, that normally close entrance-passages of delivery-spouts 74, which spouts are adapted to receive independent-vote tickets $z'$, shown as of disk-like form, (see Figs. 20 and 23,) and deliver the same into suitable receptacles in the base 2. A spring 75 yieldingly draws each slide 72 forward, as shown in Figs. 20 and 21. A stop-pin 76 on the frame 10 coöperates with an arm 77 on each shaft 67 to limit the movement of said shaft under the action of the spring 75.

To the bottom of the frame 10 is pivoted a lifting-lever 78, having a cam-surface 78$^a$, and the free end of which lever is pronged and underlies the collar 69 of the shaft 67. The depending flange of the three slides 82 at the left are provided with cam-studs 82$^a$, that support the free ends of the levers 78 and coöperate with their cam-surfaces 78$^a$.

When one of the actuating-levers appropriated to independent votes is moved from its normal position (indicated by full lines in Fig. 6 and by dotted lines in Fig. 7) into its "set" position, (indicated by full lines in Fig. 7,) its cam-lug 35 engages the corresponding arm 68 of the rock-shaft 67 and causes said shaft and parts carried thereby to move into the position indicated by dotted lines in Fig. 6. Under this movement of the said rock-shaft its arm 70, acting on the pin 71, forces the slide 72 rearward far enough to cause the cut-off blade 73 to open up the spout 74 and permit one of the disk-like tickets $z'$ to drop into and through the said spout. The said spout is thus opened up a very short length of time, preferably only sufficient to permit one of the tickets z to drop. This very quickly closing action of the spout is due to the fact that when the parts reach the positions indicated by dotted lines in Fig. 6 the cam-lug 35 passes out of the arc of movement of the engaged tappets of the shaft 67 and permits the spring 75 to quickly restore the cut-off blade 73, the slide 72, and rock-shaft 67 to their normal positions. To permit the "independent-vote" actuating-levers to be returned to normal positions with their cam-lugs 35 again to the left of the shaft-arms 68 the shaft 67 is raised far enough to carry its arms 68 into horizontal line with the space between the actuating-levers, as indicated by dotted lines in Fig. 20. This vertical movement of said shaft is effected by a vertical movement of the lifting-lever 78, and said lever is raised by the engagement of the cam-studs 78$^a$ with the cam-surface of said lever.

*Restoring mechanism.*—To simultaneously return all of the set actuating-levers of a given series to normal position, there is provided what is herein termed a "restoring-bar." This restoring-bar 79 is vertically disposed and held for parallel movement by a pair of links 80, pivoted thereto and to lugs 81 on the upper and lower portions of the corresponding frame, as best shown in Figs. 6 and 9. As is evident, when the restoring-bar 79 is moved forward from its normal position (indicated by full lines in Figs. 6 and 9) into the position indicated by dotted lines in Figs. 7 and 9, the said levers will be restored to normal positions.

For each restoring-bar 79 there is a so-called "restoring-slide" 82, which is mounted to move horizontally from front to rear of the machine in suitable guides 83, formed in the lower portions of the corresponding frames 10, as best shown in Figs. 5 and 6. As shown, the restoring-bars 7 and 9 work through clearance-slots 82$^b$, cut in the respective slides 82. Each restoring-slide has a depending flange equipped with a cam-acting roller or stud 84, which when the slide is moved forward engages first with a cam-surface 85 and then with a depending finger 86 of the corresponding lower link 80. When the roller engages the cam-surface 85, it moves the links and connected restoring-bar slowly, but with an inversely great power. This slow but powerful action makes it easy to start the actuating-levers toward their normal positions. After they have been started or given an initial movement the roller 84 engages the finger 86 and imparts an accelerated movement to the said links and restoring-bar. It will be noted that a considerable initial movement of the slide 82 is required to bring the roller 84 into action on the cam-surface 86. The purpose of this will appear in the description of the operation. Each restoring-slide 82 is further provided near its forward end with a longitudinal cam-slot 87, the forward portion of which turns abruptly toward the left with respect to Figs. 4, 6, and 7. The roller-equipped studs 41 of the arms 40 of the eccentric-shafts 39 work in these cam-slots 87.

The initial forward movement of the slide 82 causes the cam-groove 87, acting on the roller 41, to oscillate the eccentric-shaft 39 and cause the same to throw the pawls 36 of the said actuators rearward from the inoperative position (indicated by dotted lines in Fig. 6) into an operative position. (Indicated by full lines in Fig. 7.) It will be noted that in moving one of the actuating-levers from its normal position to a set position and back again while the eccentric-shaft 39 stands in a normal position the hooked end of the pawl 36 will clear the teeth of the tally ratchet-wheel 14 and will not operate thereon. This is desirable in order that a voter even after having moved an actuating-lever into a set position may change his vote. Attention is here called to the fact that the above-noted movement of the eccentric-shaft and pawls 36 is accomplished while the roller 84 of the actuating-slide 82 is being moved forward into action on the cam-surface 85 of the lower link 80.

The several restoring-slides 82 are connected for simultaneous movement by a tie-bar 88, mounted for parallel movements in a horizontal plane, by a parallel bracket-like link 89, pivoted thereto and to the front of the base 2, as best shown in Figs. 2 and 4. The forward ends of the restoring-slides 82 are detachably connected to the tie-bar 88, as shown, by roller-equipped studs 90, carried by said slides and working in slots 91 of said tie-bar 88.

A hand-lever 92, pivoted to the top and front portion of the base 2, is provided with an eccentric hub 93. A connection, as shown, in the form of a chain 94 is attached at one end to the tie-bar 88 and at its other end is attached to and adapted to be wound on the said eccentric hub 93. (See Figs. 2, 4, and 16.) The tie-bar 88 is further connected, as shown, by a link 95 to the forward end of a plunger 96, which is mounted to slide through bearings 97 and 97$^a$ on the rear portion of the base 2, as best shown in Figs. 4 and 16. The rear end of the plunger 96 is provided with an exposed handpiece 96$^a$, by means of which it may be drawn rearward. Said plunger is adapted to be locked in either one of two extreme positions by a lock best afforded by a pair of lock-blades 98, pivoted to the inner bearings 97 and adapted to engage one or the other of two notches 99, formed in said plunger. A spring 100 connects the free ends of the lock-blades 98 and yieldingly draws said blades onto the plunger.

The lock-blades 98 may be released from the plunger by a key-rod 101, suitably mounted in the base 2 and provided at its inner end with an oblong head 102, which when turned as shown by dotted lines in Fig. 17 and by full lines in Fig. 18 spreads the lock-blades 98 and releases the plunger 96. As shown, the key-rod 101 is provided with a detachable finger-piece 103. (Shown both by full and dotted lines in Fig. 4.)

Secured to the plunger 96 is a trip-finger 104, which works on a guide-rod 105, suitably supported by the base 2. (See Figs. 4 and 18.) The key-rod 101 is provided with a projecting arm which terminates in a rounded cam-head 106, that stands in the path of movement of the trip-finger 104. (See Figs. 4, 18, and 19.)

*Operation.*—When the machine is adjusted as above described, it is adapted for use at so-called "final elections" or at elections where a so-called "split ticket" may be voted, and its action is then substantially as follows: The four frame-sections 10 will of course stand upright, and the actuators and various other devices will all stand in their normal positions above indicated. The voter may move the proper number of actuating-levers 25 into set positions, as indicated by full lines in Fig. 7, under which movements the eccentric-shaft 39 will hold the hooked ends of the pawls 36 out of engagement with the tally ratchet-wheels 14, so that any one of the said actuating-levers may be set and again returned individually to normal position without action on the corresponding tally. The action of the vote-limiting mechanism has already been described, and the action of the so-called "stright-vote stop-blade" has been briefly indicated, but is further made clear by the following statements: By inspection of Fig. 7 it will be seen that when one of the levers 25 appropriated to straight votes has been moved into a set position the cam-surface 34 thereof acting on the edge of the blade-section 56ª will move the same rearward and through the lever 59 and links 62 move the blade-section 56 forward, so that its edge will stand in front of the shoulders 33 of all of the levers 25 which are appropriated to individual votes, thereby locking said latter levers in their normal position. On the other hand, whenever one of the actuating-levers appropriated to individual votes is moved into a set position a reverse movement of the blade-section 56 and 56ª will take place and all of the straight-vote levers will be locked in normal positions. The straight-vote levers of a given section of the machine of course constitute one group, and the coöperating vote-limiting mechanism is arranged to permit the movement of but one of the said levers of the group. Assuming now that all of the actuating-levers are set which the voter is entitled to use, he would take hold of the lever 92 and then give the signal to the attendant, who by turning the key 103 and its shaft 101 ninety degrees, as indicated by dotted lines in Fig. 17, will release the plunger 96 and permit the operator to move the lever 92, together with the tie-bar 89 and restoring-slides 82, into the positions indicated by dotted lines in Figs. 4 and 7. As the plunger 96 is drawn forward its trip-finger 104 engages the cam-head 106 of the key-rod 101 and moves the same, as indicated by dotted lines in Fig. 18, so that the spring 100 will then draw the locking-blades 98 onto the plunger. This releasing of the locking-blades at this time is important in order that they may engage the rear notch 99 of the said plunger and lock the same and the above-noted parts 88 and 82 in the dotted-line positions just noted. After a person has voted and left the machine the operator or attendant resets the machine first by again turning the key-shaft 101 so that its head 102 again stands as indicated by dotted lines in Fig. 17 and then restores the movable parts to normal positions by drawing rearward on the operating-plunger 96. Under the outward movement of the plunger its tripping-finger 104 again acts on the cam-head 106 of the key-shaft 101 and trips the locking-blades 98 again into action in the manner previously described. Hence when the plunger reaches its normal position to the rear the lock-blades 98 will automatically engage the forward notch 90 thereof and lock the said plunger and parts connected thereto in their normal positions. Under the initial forward movement of the tie-bar 88 and restoring-slides 82 the cam-grooves 87, acting on the rollers 41 of the eccentric-shaft arms 40, throws the pawls 36 slightly rearward, so that their ends stand in position for action on the ratchet-wheel 14 of the respective tallies, as already more fully described. This same initial movement of the said tie-bar 88 and restoring-slides 82 carries the cam-studs 82ª of said slides against the cam-surfaces 78ª of the lifting-levers 78, (see Fig. 20,) and thereby raises the rock-shafts 67 and moves its tappets 68 out of line with the cam-lugs 35 of the actuating-levers 25, as shown by dotted lines in Figs. 9 and 20. This, as already stated, prevents interference by the tappets 68 with the return movements of the coöperating levers 25. Continued forward movements of the restoring-slides brings the rollers 84 of said slides into action on the lower link 80 in a manner already fully explained, and thereby moves the restoring-bars 79 forward into a position indicated by dotted lines in Figs. 7 and 9 and simultaneously restores to normal position all of the set actuating-levers, under which movements to normal the pawls 36 operate upon the corresponding ratchet-wheels 14, and thus actuate the tallies and record the votes thereon. After the polls have closed and before the machine is opened up the tally-locking bars 16 should be moved so as to lock the tallies, which action has been fully described in connection with details shown in Figs. 29 and 30 and also in Fig. 16. In this way all danger of the tallies being moved from their properly-set positions, either by accident or design, is obviated.

In resetting the machine the frame-sections 10 and the mechanisms mounted thereon are preferably turned downward into horizontal positions, as indicated by full lines in Fig. 3, so as to give ready access to the various devices that are to be readjusted. In resetting the vote-limiting devices and in rearranging the groups of mechanism to correspond to different ballots or tickets the gear-segments 32 of the actuating-levers are thrown out of mesh with the coöperating pinions 45, this being conveniently accomplished with the construction illustrated in Figs. 10, 11, and 12 by springing the latches 29 out of operative positions and moving the said levers as far as permitted by their slots 31, this being clearly shown in Fig. 10.

It will of course be understood that the machine above described is capable of many modifications as to details of construction within the scope of my invention herein set forth and claimed.

In practice I propose to mark the spaces in a particular column opposite the keys assigned to so-called "independent" votes with different numerals and to mark the blank tickets or disks $z'$ which are to be used to cast votes for the several different offices with corresponding numerals. This will prevent the use of more than one of the blank tickets to vote for a particular candidate. The voter will of course be given but one blank ticket of each kind.

What I claim, and desire to secure by Letters Patent of the United States, is as follows:

1. In a voting-machine, the combination with a group of registers and register-actuators, of a restoring-bar mounted on parallel pivoted links for parallel swinging movement in a constant plane for action on said actuators, to restore the same to normal positions, and a restoring-slide for operating said restoring-bar, substantially as described.

2. In a voting-machine, the combination with several series of registers and register-actuating levers, of register-actuating pawls pivoted to said levers, a restoring-bar for each series of levers, a restoring-slide operating on each restoring-bar, a tie-bar operating on the several restoring-slides, a handpiece for operating said tie-bar, and an eccentric operating on each series of pawls to throw the same to and from operative positions and provided with a projecting arm subject to a cam-groove in the corresponding restoring-slide, substantially as described.

3. In a voting-machine, the combination with several series of registers and register-actuators, of register-actuating pawls subject to said actuators, a restoring-bar for restoring said actuators to normal position, a restoring-slide operative on said restoring-bar, a tie-bar connecting the several restoring-slides for simultaneous movements, means for operating said tie-bar, and a shifting device operating to throw each series of pawls to and from operative positions, which shifting device is subject to said restoring-slide, substantially as described.

4. In a voting-machine, the combination with a group of registers and register-actuators, of register-engaging pawls subject to said actuators, means for moving said pawls to and from operative positions, a restoring-bar operative to restore said actuators simultaneously to normal position, thereby imparting operative movements to said pawls, and a restoring-slide operative, by initial movement, on said pawl-shifting means, to throw said pawls into operative positions, and operative, by continued movement, to move said restoring-bar, substantially as described.

5. In a voting-machine, the combination with a group of registers and register-actuating levers, of register-engaging pawls, operated by said levers, an eccentric for moving said pawls into and out of operative positions, said eccentric having a projecting arm, a restoring-bar operative on said levers, for simultaneously restoring the same to normal position, and a restoring-slide operating on said restoring-bar and having a cam-groove operating on the arm of said eccentric and serving, under an initial movement, to throw said pawls into operative positions, substantially as described.

6. In a voting-machine, the combination with a group of registers and pivoted register-actuating levers, of a restoring-bar mounted for parallel swinging movement for action on said actuating-levers, a restoring-slide operating said restoring-bar, and a hand-lever with connections for operating said restoring-slide, substantially as described.

7. In a voting-machine, the combination with a group of registers and register-actuating levers, of a lever-restoring bar, a pair of parallel links supporting said bar, and a restoring-slide having a part operating on one of the said links, to move said restoring-bar and cause the same to simultaneously restore the "set" levers to normal positions, substantially as described.

8. In a voting-machine, the combination with a base-support, of a plurality of frame-sections pivoted to said support for a hinge-like movement to and from operative positions, and voting mechanism, involving groups of registers and register-actuators, mounted on each frame-section, substantially as described.

9. In a voting-machine, the combination with a base-support, of a frame-section pivoted thereto, groups of registers and register-actuators mounted on said pivotal frame, an actuator-restoring bar mounted on said frame, a bar-actuating slide also mounted on said frame, and a hand-operated power device for operating said slide, having a part with which said slide is engageable and disengageable by pivotal movements of said frame, substantially as described.

10. In a voting-machine, the combination with a group of registers, of a corresponding group of register-actuating levers, which levers are movable into abnormal inoperative positions, and are provided with devices for actuating said registers, vote-limiting mechanism, and a detaining-strip, normally acting as a stop for the operative actuating-levers and serving to lock in abnormal inoperative positions, such of said levers as are thrown out of action, substantially as described.

11. In a voting-machine, the combination with registers and register-actuators, of means for causing the votes to be recorded after the actuators have been set, involving an operating plunger or slide, a lock for the same, a lock-releasing device, and a trip for said lock-releasing device, arranged to be thrown into action by the operative movement of said plunger or slide, substantially as described.

12. In a voting-machine, the combination with registers and register-actuators and means for recording votes when the said actuators are moved back to normal positions, of means for restoring said actuators to normal position, involving a plunger or slide, a lock for securing the same in its extreme positions, a releasing device for holding said lock inoperative, and a trip carried by said plunger or slide and operating on said releasing device, to automatically render said lock operative, substantially as described.

In testimony whereof I affix my signature in presence of two witnesses.

SYVER LOE.

Witnesses:
ELIZABETH H. KELIHER,
F. D. MERCHANT.